(12) United States Patent
Erickson, Jr. et al.

(10) Patent No.: US 8,671,345 B2
(45) Date of Patent: Mar. 11, 2014

(54) WORKFLOW-BASED SESSION MANAGEMENT

(75) Inventors: Thomas E. Erickson, Jr., Merrimack, NH (US); Donald Adrian Dewar, Jr., Derry, NH (US); Richard Conrad Clemson, Northborough, MA (US); Andrew James Rampulla, Harleysville, PA (US); Changgeng Li, Beijing (CN)

(73) Assignee: Beaumaris Networks Inc., Boxborough, MA (US)

( * ) Notice: Subject to any disclaimer, the term of this patent is extended or adjusted under 35 U.S.C. 154(b) by 288 days.

(21) Appl. No.: 13/070,758

(22) Filed: Mar. 24, 2011

(65) Prior Publication Data

US 2011/0239126 A1     Sep. 29, 2011

Related U.S. Application Data

(60) Provisional application No. 61/317,047, filed on Mar. 24, 2010.

(51) Int. Cl.
*G06F 3/00* (2006.01)
*G06F 15/16* (2006.01)

(52) U.S. Cl.
USPC ........... 715/719; 715/763; 715/748; 715/716; 725/74; 725/87; 709/201; 709/213; 709/217

(58) Field of Classification Search
USPC ......... 715/716, 719, 733, 740, 748, 763–765, 715/967; 725/34, 50, 64, 74, 82, 86, 87, 91, 725/98, 105, 110, 114, 131, 133, 143, 144, 725/146, 151, 152, 153; 709/201, 213, 217, 709/223–231, 238; 705/7.11, 7.12, 7.26, 705/7.27, 348; 719/312, 329
See application file for complete search history.

(56) References Cited

U.S. PATENT DOCUMENTS 6,948,088 B1 *  9/2005  Sharan .................... 714/6.31
2003/0046396 A1 *  3/2003  Richter et al. ................ 709/226

(Continued)

FOREIGN PATENT DOCUMENTS

EP        2550630        1/2013
WO   WO 2011/119851    9/2011

OTHER PUBLICATIONS

Int'l Search Report mailed Jul. 26, 2011 from corresponding Int'l Application No. PCT/US11/29821.

(Continued)

*Primary Examiner* — Xiomar L Bautista
(74) *Attorney, Agent, or Firm* — Patent Capital Group

(57) ABSTRACT

Techniques disclosed herein include systems and methods that provide a workflow-based session manager or workflow engine for a content delivery system, such as for delivering video-on-demand, streaming audio, streaming video, etc. Such techniques increase velocity and flexibility of deploying new features and services in a video delivery system. Techniques include a session management model provides a service-oriented and workflow-based approach. As a service-oriented approach, each functional session management step can be represented as a business service. As a workflow-based solution, a sequence of steps to be performed can be defined as data, rather than being hard-coded inside an application. Defined as data, steps (nodes, tasks) can then be created and changed using a graphical editor. New services can be added by defining actions for the new service, and adding a node to a given session management workflow sequence. Techniques include a workflow engine that initiates session management in realtime.

21 Claims, 12 Drawing Sheets

(56) References Cited

U.S. PATENT DOCUMENTS

| | | |
|---|---|---|
| 2003/0058277 A1* | 3/2003 | Bowman-Amuah .......... 345/765 |
| 2004/0059836 A1 | 3/2004 | Spaepen |
| 2007/0107012 A1 | 5/2007 | Rachamadugu |
| 2009/0013347 A1 | 1/2009 | Ahanger et al. |
| 2009/0097815 A1 | 4/2009 | Lahr et al. |
| 2009/0199209 A1* | 8/2009 | Arimilli et al. ............... 719/314 |
| 2012/0303787 A1* | 11/2012 | Fan et al. ..................... 709/223 |

OTHER PUBLICATIONS

PCT Sep. 25, 2012 International Preliminary Report on Patentability and Written Opinion from International Application No. PCT/US11/29821.

EPO Apr. 24, 2013 Response from European Application No. 11760231.

* cited by examiner

```
402
    <node name=" SendTextMessageNotification">
        <action class="org.jboss.soa.esb.services.jbpm.actionhandlers.EsbSynchronousActionHandler">
            <timeout>12345</timeout>
            <esbServiceName>SendTextMessageNotification</esbServiceName>
            <esbCategoryName>catv-sm</esbCategoryName>
            <bpmToEsbVars>
                <mapping bpm="net_beaumaris_commonesb_actions_TimingAction_stack"
                    esb="net_beaumaris_commonesb_actions_TimingAction_stack" />
407 ⎧   <mapping bpm="sessionId"                                                    esb="serverSessionId" />
    ⎪   <mapping bpm="validatePlayEligibityEligibityResponse.PlayEligibility.price"         esb="transactionAmount" />
    ⎨   <mapping bpm="validatePlayEligibityEligibityResponse.PlayEligibility.titleAssetID"  esb="titleAssetId" />
    ⎪   <mapping bpm="validatePlayEligibityEligibityResponse.PlayEligibility.isPreview"     esb="isPreview" />
    ⎪   <mapping bpm="validatePlayEligibityEligibityResponse.PlayEligibility.movieRating"   esb="movieRating" />
    ⎪   <mapping bpm="validatePlayEligibityEligibityResponse.PlayEligibility.tvRating"      esb="tvRating" />
    ⎩   <mapping bpm="playlistEngineResponse.playList"                              esb="playlist" />
            </bpmToEsbVars>
        </action>
        <transition to="DetermineIfCempBillingRecordExists"></transition>
    </node>
```

FIG. 4

```
<service category="catv-sm" name="SendTextMessageNotification"
    <property name="maxThreads" value="10"/>
    <actions mep="RequestResponse">
    <action name="PerfMetricsStart" class="net.beaumaris.commonesb.actions.TimingAction"
        process="start"><property name="name" value="SendTextMessageNotification "/></action>
        <action name="LogMessage" class="net.beaumaris.commonesb.actions.LogMessageAction"
            process="trace"><property name="prefix" value="UpdateTweetStatus: "/></action>
    <action name="SendNotification" class="net.beaumaris.textmessage.esb.actions.TextMessageAction"
        process="sendTextNotification" />
    <action name="PerfTimerStop" class="net.beaumaris.commonesb.actions.TimingAction" process="stop"/>
    <action name="LogMessageResponse" class="net.beaumaris.commonesb.actions.LogMessageAction"
        process="trace"><property name="prefix" value="SendTextMessageNotification Response: "/></action>
    </actions>
    </service>
</services>
```

FIG. 5

WORKFLOW-BASED SESSION MANAGEMENT

CROSS REFERENCE TO RELATED APPLICATIONS

The present application claims the benefit of U.S. Provisional Patent Application No. 61/317,047, filed on Mar. 24, 2010, entitled "Workflow-Based Session Management," which is incorporated herein by reference in its entirety.

BACKGROUND

The present disclosure relates to session management of video delivery systems. Network transmission of video or other content services, such as cable television, video-on-demand (VOD), switched digital video (SDV), and video file downloads, continues to proliferate as the network infrastructure continues to evolve to support the high demands of such services.

Many network infrastructures include headends for providing video services, applications for delivering the video services, and video servers that serve the content to set-top boxes or other user devices (typically installed in a person's home) for rendering the service (e.g. a pay-per-view movie) to users. Such networks typically arrange set-top boxes into service groups, which are collections of set-top boxes served by a common set of connections emanating from the headend and terminating at the service groups. Typically, each set-top box is disposed in geographic proximity to others in the group, and the connections defined by physical coaxial cable (coax) runs that branch out to the various service groups. Set-top boxes evolved to individually addressable network devices, thereby enabling video-on-demand, switched digital video, and other selective viewing techniques that provide a greater granularity of control to client devices.

Other network infrastructures include Internet Protocol (IP) based video delivery of digital content. With IP based video delivery, a provider typically operates through multiple servers for providing video delivery service. In accordance with such technology, a client may request IP-based video from a streaming server to view video on a client device such as a television, computer, mobile device, or other device suitable for watching or storing IP-based video content. Typically, the streaming server services a request by streaming the requested content to the client through, for example, a cable modem, an Internet connection, etc., in a customer's home network.

Video delivery systems typically use communication sessions between a client and server (and/or session manager) to manage selective content delivery of content, such as video-on-demand content. A given session is usually initiated upon receiving a request from a client device for specific content. Session management often includes authentication, authorization, expanding content into a playlist, and reserving network/system resources for the duration of a given session. A typical conventional session manager application is a single monolithic application that implements these VOD features and manages delivery of the content such as video data from a video server to a set-top box. The conventional VOD session manager application is installed at the separate individual headends

SUMMARY

Conventional applications for session management of content delivery such as video-on-demand session management applications suffer from a variety of deficiencies. Most multiple systems operators (MSOs), that is, operators of multiple cable television systems, have deployed video-on-demand (VOD) solutions on a local scope, that is, associated equipment and software is installed geographically where subscribers are located. For example, if two cities are distinct service areas, then a headend for each service area will have its own instance of: a BackOffice (which includes a Session Manager) to manage the distribution and delivery of content; Video Server(s) to deliver the content to an Edge Device; and Edge Device(s) to deliver the content to the subscriber. This approach is represented in FIG. 1. Midsize MSOs can have dozens of local deployments, while large MSOs can have hundreds or thousands of local deployments that replicate these system components. The session manager application is a single monolithic application that is installed within each local deployment. The more service areas an MSO contains, the greater the time, expense and complexity required to upgrade a session manager application at each location. This is because upgrading an MSO's overall video delivery system requires physically updating each headend, such as by sending technicians to each headend to install new software and/or hardware. Since each headend location includes a separate instance (e.g. executable) of the session manager, to upgrade features of the session manager requires that new software be brought to the location, installed, then the old version must be halted from execution (this may temporarily interrupt service) and the new version must be started.

This VOD deployment approach has resulted in several challenges for the local deployments. One issue is that equipment and session management software is localized to each headend. Another issue is that the localized equipment has a limited capacity, which then limits a subscriber base. Expansion of session management services is expensive and time-consuming to perform upgrades since there are numerous instances of software and hardware in distributed locations that must be modified. Furthermore, such session managers are monolithic session management applications, wherein a single vendor bundles system components in a given deployment using closed, proprietary interfaces to communicate between respective components. In other words, conventional VOD deployments use hardwired control logic at localized locations, that is, a single piece of code that does everything from session step-up to resource management to session tear-down, with no or limited flexibility in changing or modifying that code.

Conventional VOD deployment architecture uses session management systems that are monolithic in nature (e.g. compiled code that executes as an application), and built specifically to handle the requirements imposed by that architecture, especially with regards to supporting a reduced number of subscribers and limited need for scaling and reliability. Designing to these constraints has led to a number of challenges. One challenge is long implementation timeline for new session management features. For example, rolling out of new service can take six months to two years to complete. Upgrading such systems is difficult and time-consuming because the system is monolithic. Software upgrades generally mean replacing the entire system, and hardware upgrades (such as adding more storage) can mean taking the entire system down. There are also limited resiliency capabilities. Because of the limited subscriber base it has been acceptable to employ a reduced availability solution, allowing vendors to implement a 1+1 approach to resiliency. With 1+1 resiliency, a pair of session managers is deployed in either active-active or active-passive modes of operations. Yet another challenge is that of closed interfaces. Building monolithic systems has allowed vendors to use closed interfaces, making integration of new components difficult and making it nearly impossible to have "plug and play" services provided by different vendors.

Many video delivery providers, MSOs, cable operators, and other VOD suppliers desire to update their architectures to be able to greatly expand content offerings, such as by moving from thousands of titles to hundreds of thousands of titles or more. Another architecture update is to regionalize or nationalize content distribution channels, most often via a Content Delivery Network (CDN). For example, rather than having content received locally at a headend and always being present, content can be received at a limited number of regional or national locations. The content can then be distributed to the subscribers based on demand or predefined rules. In conjunction with regionalization or nationalization of the content, providers are also centralizing session management components of their systems. The regionalization of session management functionality is represented in FIG. 2.

The session manager is responsible for managing sessions in video-on-demand systems. Session management activities can include authentication, authorization, billing, reserving network resources, and so forth. Session managers now have performance expectations. For example responses to a video-on-demand selection should be delivered to client applications, and especially to the subscriber, within a very short time frame. This time frame is ideally within about 100-200 milliseconds so that subscribers do not need to wait long to begin receiving video content. Retries can be built into certain system interactions, including when a given user retries purchasing a movie if an initial attempt fails or is perceived as taking too long. This means that the Session Manager itself is usually not responsible for retrying operations.

Centralizing the session management results in additional performance expectations. Large-scale regions can support tens of millions of subscribers. This means that a centralized session manager can be responsible for hundreds of thousands of concurrent sessions, and thousands of setups per second. To support these large-scale regions a session management system should provide constant availability of services, capability to upgrade systems while they are live without interrupting service to end users, and rapid implementation and deployment of new services.

Techniques disclosed herein include systems and methods for a workflow-based session manager of a video delivery system. Such techniques increase velocity and flexibility of deploying new features and services in a video delivery system. Such workflow-based session management techniques combat challenges associated with existing session manager systems, and support the expectations from the next-generation (centralized) video-on-demand system architecture. The systems and methods for a workflow-based session management for a video delivery system described herein include a new architectural model for session management. Such a new session management model provides a service-oriented and workflow-based approach. As a service-oriented approach, each functional session management step can be represented as a business service. Such an approach fosters competition at the service level, which leads to a best of breed solution for each service, rather than competition being at the system level as was done in bundled monolithic systems. New functionality can now be defined in terms of the service interface, and implemented and tested independently of the rest of the system. Existing functionality in a service can be enhanced and tested independently of the rest of the system, and can be introduced by upgrading the service rather than the entire system.

Furthermore, session management services can be reused in different applications. As a workflow-based solution, a sequence of steps to be performed can be defined as data, rather than being hard-coded inside an application. For example, a given sequence of steps is defined in an XML file, which can then be created and changed using a graphical editor. Each node (task) on a given workflow represents a service to be invoked, and data passed to and from each service can also be defined in an XML or other data file. Defining the workflow as data decouples services from the control flow, supporting independent development of the services by multiple vendors. This technique greatly increases the velocity of introducing new services, because introducing a given new service to the system is primarily accomplished by updating configuration files, with little or no new code required. Adding a new service can then be accomplished by adding a new node to a workflow, along with a supporting set of implementations for that node, without needing to modify the session manager itself. Workflow-based session management can also be configured so that any given nodes can be selectively enabled for some of the headends, or all of the headends based on some predetermined criteria, such as by client IP addresses, geography, ratings, etc. Thus, such a workflow-based session management system allows operators to express what a session manager is supposed to do, and an order of doing tasks, as data instead of pre-compiled code.

Conventional workflow management systems generally include a computer system that manages and defines a series of tasks within an organization to produce a final outcome or outcomes. Workflow management systems enable users to define different workflows for different types of services, jobs, or processes. Workflow systems are typically used in the context of business management. For example, workflow systems are often used for manufacturing a particular type of good, completing a research and development product, distributing goods in various channels, providing professional services such as medical services, etc. In the context of project development, a workflow system might automatically route a design document from a technical director to a production engineer, or move the design document between different stages of development. Once a given task is completed, conventional workflow software ensures that individuals responsible for the next task are notified and receive data they need to execute the next stage of the process.

A number of workflow frameworks are available today, both as open-source and as for-purchase offerings. These conventional workflow frameworks, however, are built to handle diverse conditions and services that can take from minutes to weeks to complete (including human-in-the-loop services). To handle these situations, it is common for a workflow framework to persist a workflow state at each boundary crossing from a workflow tier to the service tier. It is also common to load the workflow state during the transition from the service tier to the workflow tier, and use two-way asynchronous communications between the workflow tier and the service tier. Persistence activities are often managed by considering each node in the workflow to be an individual transaction, so that upon failure of a given service the state of the workflow can be rolled back. The persistence and transaction activities of a conventional workflow framework can be CPU-intensive and I/O-intensive operations, consuming seconds or more of time. When present in systems with long—and very long-lived services—this functionality can be useful.

Conventional workflows systems are typically executed via a "workflow engine." A workflow engine is generally a software-based control system or process that manages workflows. Workflow engines are thus configured to process workflow events/nodes by accessing a sequence of activities, and this sequence can be defined by data or data files. The workflow engine provides mechanisms for executing and scheduling work items according to a predefined sequence and/or predefined rules. Because workflows define a sequence of tasks to execute, some tasks are dependent on completion of prior tasks, or dependent on data generated from prior tasks. The workflow engine also manages passing any data generated from a given task (service) to a subsequently executed task. In other words, a workflow engine receives a script that specifies a set and sequence of actions. The workflow engine then performs those actions in the sequence specified in the script, whether that sequence is serial or parallel. Workflow engines typically use a database to store a state of the script and data generated between actions. Example workflow engines and systems include jBPM (JBoss Business Process Management), Tibco BusinessWorks, iProcess Suite, Joget, Enhydra Shark, Bonita, and others.

Conventional workflow systems, in essence, take a usage scenario, break that usage scenario into discrete chunks or tasks, and then stitch those chunks together to define an execution sequence. With the conventional approach to workflow systems, such systems cannot be applied to realtime systems. What is realtime can be dependent on a particular application. In the context of content delivery and video content delivery, realtime can mean less than about a half a second, and should be closer to about 100-200 milliseconds. For example, a user selecting VOD content may perceive a system as slow if—after selecting an on-demand video title—the video delivery system takes a second or longer to start playing video. Conventional workflow systems typically do not complete processing of workflow sequences in less than one or even a few seconds. Indeed, many workflow sequences take days or weeks to complete, and involve human input at various stages. As such, conventional workflow frameworks (open source or proprietary) are not designed with execution speed in mind because of the typically long sequence completion times. To provide such expected realtime responses, conventional systems are monolithic, that is, executing precompiled code to provide realtime results. As explained above, however, though monolithic systems are quick, they do not scale well or enable fast addition of services. Indeed, conventional wisdom teaches away from applying any type of a workflow-oriented approach to realtime session setup, or to any realtime systems.

Techniques disclosed herein use a workflow-based session management system, which can include use of a workflow engine for processing a sequence of nodes (tasks, events, transactions). To achieve the near real-time performance expected of a workflow-based session manager, the system can execute various process steps. The system loads definitions of workflows at startup of a session and caches the definitions. Then, the system determines a next node to execute by examining the cached workflow definitions. The session manager synchronously invokes the service(s) associated with each node in the workflow sequence. The system does not persist workflow states at each node transition, which is a significant improvement over conventional workflow systems. Accordingly, the session manager can support highly concurrent processing of workflows by providing thread pools available for executing each service, execute a workflow inside a single transaction, and return an appropriate error code to the end user application upon detection of any failure. Such techniques provide a deterministic approach to video delivery session management with very low latency and low overhead in the workflow infrastructure, thereby providing operators (including non-technical operators) with the ability to add and modify services.

One embodiment includes a session manager that provides session management for controlling video delivery to a client device over a network. The session manager receives a request from a client device to access video content. This request can be received at a server. For example, a user desires to watch video-on-demand content and makes a selection to view this content. The session manager accesses a data file that defines a workflow sequence to execute via a workflow engine. The workflow sequence defines multiple nodes, wherein each node identifies at least one session management service to execute. At least one node identifies data passed between given session management services. The session manager loads the workflow sequence and multiple nodes into a shared memory, such a non-volatile memory. The session manager then executes, via the workflow engine, session management services corresponding to the multiple nodes according to the workflow sequence. The session manager can then transmit instructions to a remote headend, streamer, or other content delivery system, to transmit the video content to the client device.

In another embodiment, a content delivery system enables configuring a workflow sequence for session management. The system receives input, via a user interface, that selects a set of nodes, with each node being a data file identifying at least one session management service for the session manager to execute via a workflow engine. The system receives input, via the user interface, that specifies a sequence of nodes for the workflow engine to execute, and subsequently generates a workflow data file that defines the sequence of nodes for the workflow engine to execute. For example, a user selects and arranges a sequence of nodes by using a graphical editor. The system then creates a session manager that, when executed, controls delivery of content to client devices via the workflow engine. Wherein the workflow engine executes session management services according to the defined sequence of nodes from the workflow data file.

In yet another embodiment, the content delivery system, or other appropriate entity, defines a set of nodes as data files, each node identifying at least one service to be performed using the session manager. The system defines a set of services as data files, each service identifying a set of actions referencing functionality that, when executed, provides session management processing corresponding to a respective service. The system defines a workflow processing order as a workflow data file, the workflow processing order indicating an execution sequence of the set of nodes to carry out session management of the content delivery system. The system then generates a session manager that controls delivery of content to client devices over a network. The session manager, when executed, uses a workflow engine that provides real-time execution of the set of nodes according to the workflow processing order defined in the workflow data file.

Another embodiment is a realtime workflow engine that initiates a video delivery session in realtime. That is, a workflow engine that processes a given data sequence (such as for session set-up) in realtime, such as to complete a specific sequence of tasks within a predetermined amount of time.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving, at a server, a request from a client device to access video content; accessing a data file that defines a workflow sequence to execute via a workflow engine, the workflow sequence defining multiple nodes, each node identifying at least one session management service to execute, at least one node identifying data passed between given session management services; loading the workflow sequence and multiple nodes into a shared memory; executing, via the workflow engine, session management services corresponding to the multiple nodes according to the workflow sequence; and transmitting instructions to a remote headend to transmit the video content to the client device. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Beaumaris Networks, Inc., Boxborough, Mass., USA.

As discussed above, techniques herein are well suited for use in software applications supporting video content delivery. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIG. 4 is an example code snippet of a workflow node according to embodiments herein.

FIG. 5 is an example code snippet of a workflow service according to embodiments herein.

DETAILED DESCRIPTION

Figure 1:
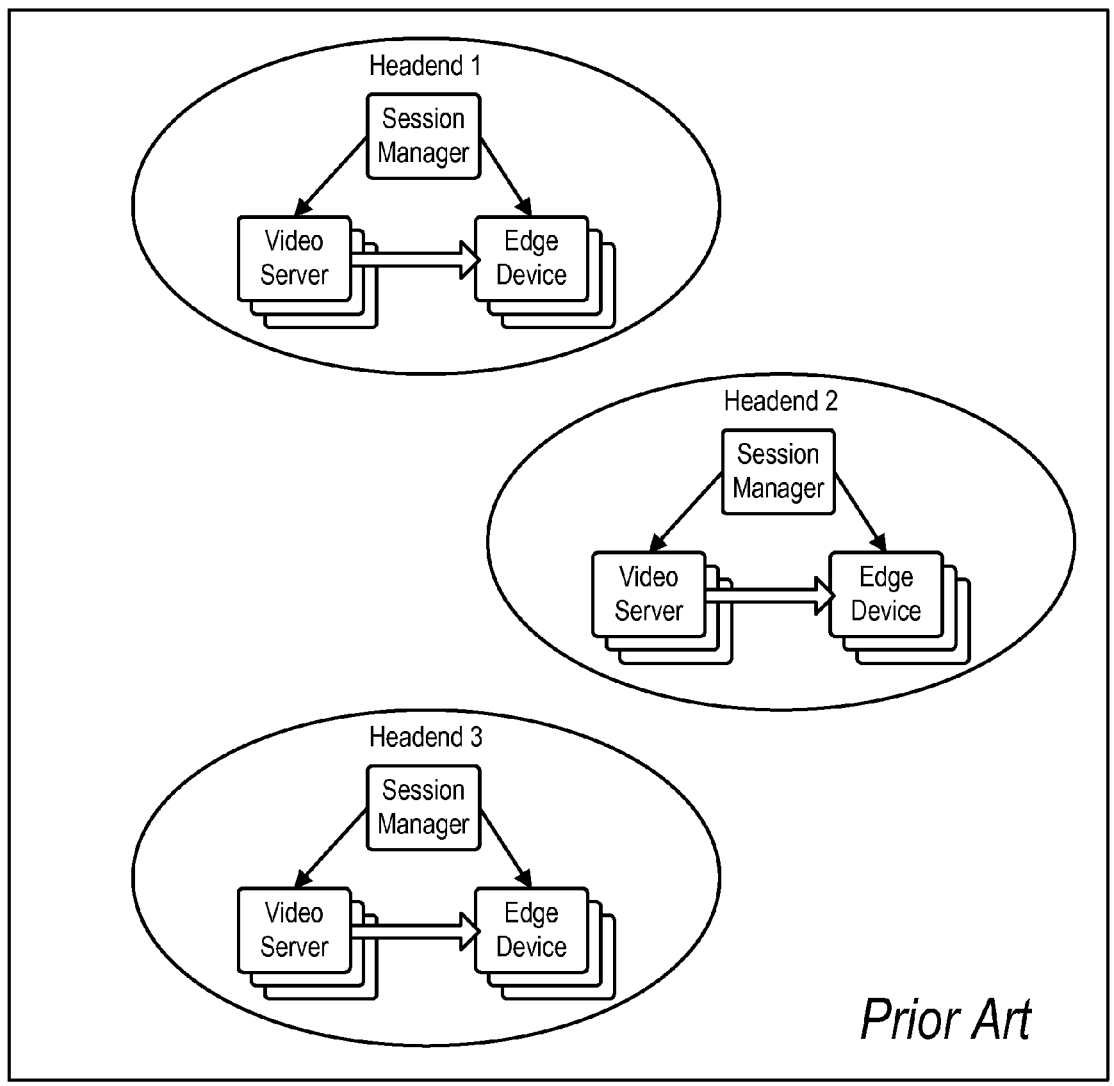
FIG. 1 is a diagram illustrating localized session management deployment in headends of a content delivery system.
Figure 2:
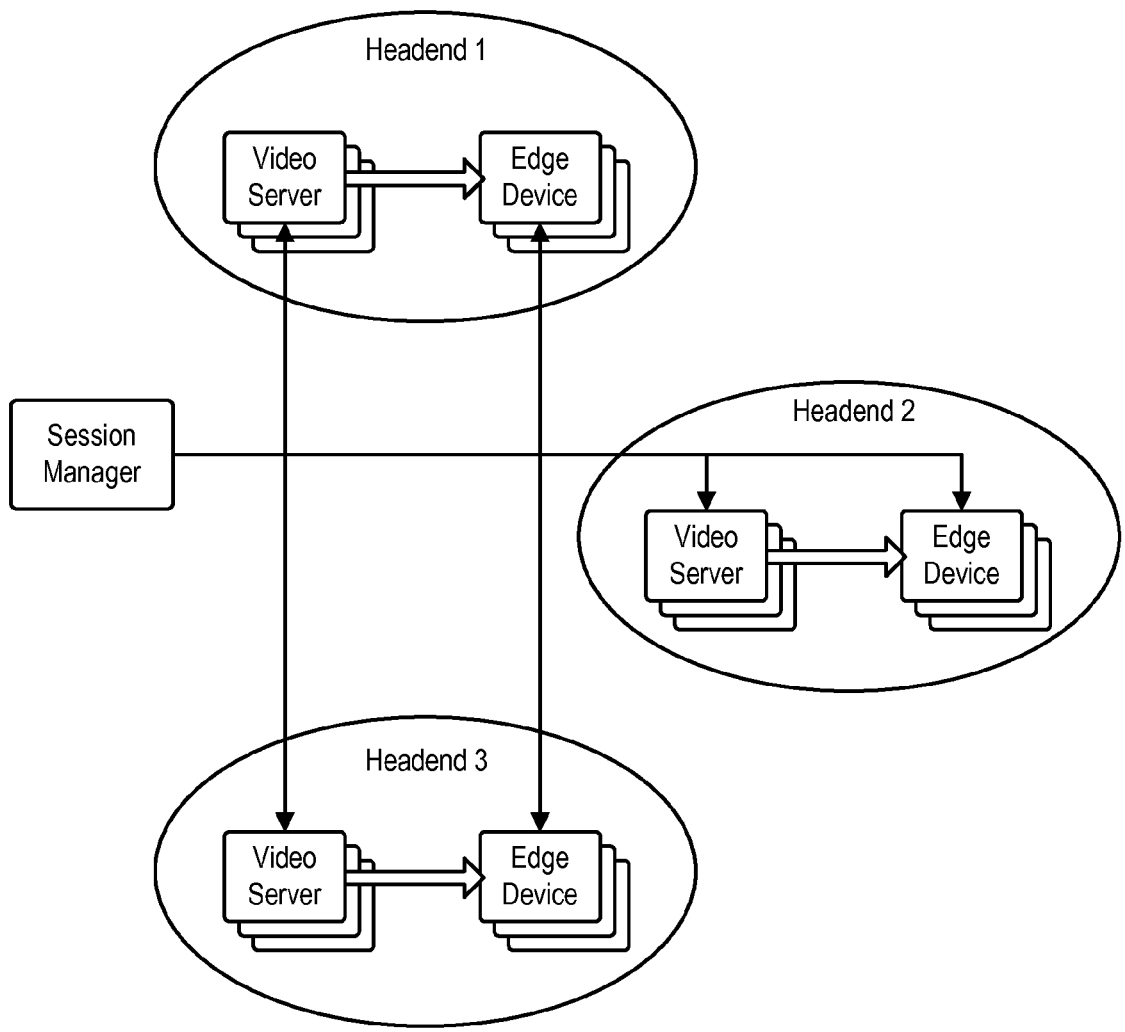
FIG. 2 is a diagram illustrating centralized session management deployment for headends of a content delivery system.

Techniques disclosed herein include systems and methods for a workflow-based session manager of a video delivery system. Such techniques increase velocity and flexibility of deploying new features and services in a video delivery system. Such workflow-based session management techniques combat challenges associated with existing session manager systems, and support the expectations from the next-generation (centralized) video-on-demand system architecture. The systems and methods for a workflow-based session management for a video delivery system described herein include a new architectural model for session management. Such a new session management model provides a service-oriented and workflow-based approach. As a service-oriented approach, each functional session management step can be represented as a business service. Such an approach fosters competition at the service level, which leads to a best of breed solution for each service, rather than competition being at the system level as was done in bundled monolithic systems. New functionality can now be defined in terms of the service interface, and implemented and tested independently of the rest of the system. Existing functionality in a service can be enhanced and tested independently of the rest of the system, and can be introduced by upgrading the service rather than the entire system. Furthermore, session management services can be reused in different applications. As a workflow-based solution, a sequence of steps to be performed can be defined as data, rather than being hard-coded inside an application. For example, a given sequence of steps is defined in an XML file, which can then be created and changed using a graphical editor. Each node (task) on a given workflow represents a service to be invoked, and data passed to and from each service can also be defined in an XML or other data file. Defining the workflow as data decouples services from the control flow, supporting independent development of the services by multiple vendors. This technique greatly increases the velocity of introducing new services, because introducing a given new service to the system is primarily accomplished by updating configuration files, with little or no new code required.

Techniques disclosed herein use a workflow-based session management system, that can include use of a workflow engine for processing a sequence of nodes (tasks, events, transactions). To achieve the near real-time performance expected of a workflow-based session manager, the system can execute various process steps. The system loads definitions of workflows at startup of a session and caches the definitions. Then, the system determines a next node to execute by examining the cached workflow definitions. The session manager synchronously invokes the service(s) associated with each node in the workflow sequence.

Caching the node definitions and generated or retrieved data can help accelerate workflow-based processing. Because conventional workflow systems deal with long-lived processes, anytime a call is made to a given node such systems persist a state of the workflow. This is a computational expensive operation because this usually involves storing the data in a database or other data store to wait until a next node is ready to be executed, such as after receiving a particular approval email. After receiving a trigger for the next task, the conventional system would restore the state of the workflow, execute a next task based on the approval email, and then store the state information again. Thus, conventional workflow systems are designed for long term processing instead of realtime processing. By caching node definitions and maintaining state information in memory, workflow processing can be accelerated. Techniques disclosed herein also improve memory management so that the in memory representation of the workflow is a very efficient data structure that is not converting data from one format to another. This is another improvement over conventional workflow systems. Conventional workflow systems often convert data from one format to another depending on what entities will be using data next. Techniques herein provide linear memory management (such as by using a Java object) without converting data back and forth between formats, to help provide realtime processing.

Accordingly, the session manager can support highly concurrent processing of workflows by providing thread pools available for executing each service, execute a workflow inside a single transaction, and return an appropriate error code to the end user application upon detection of any failure.

Figure 3:
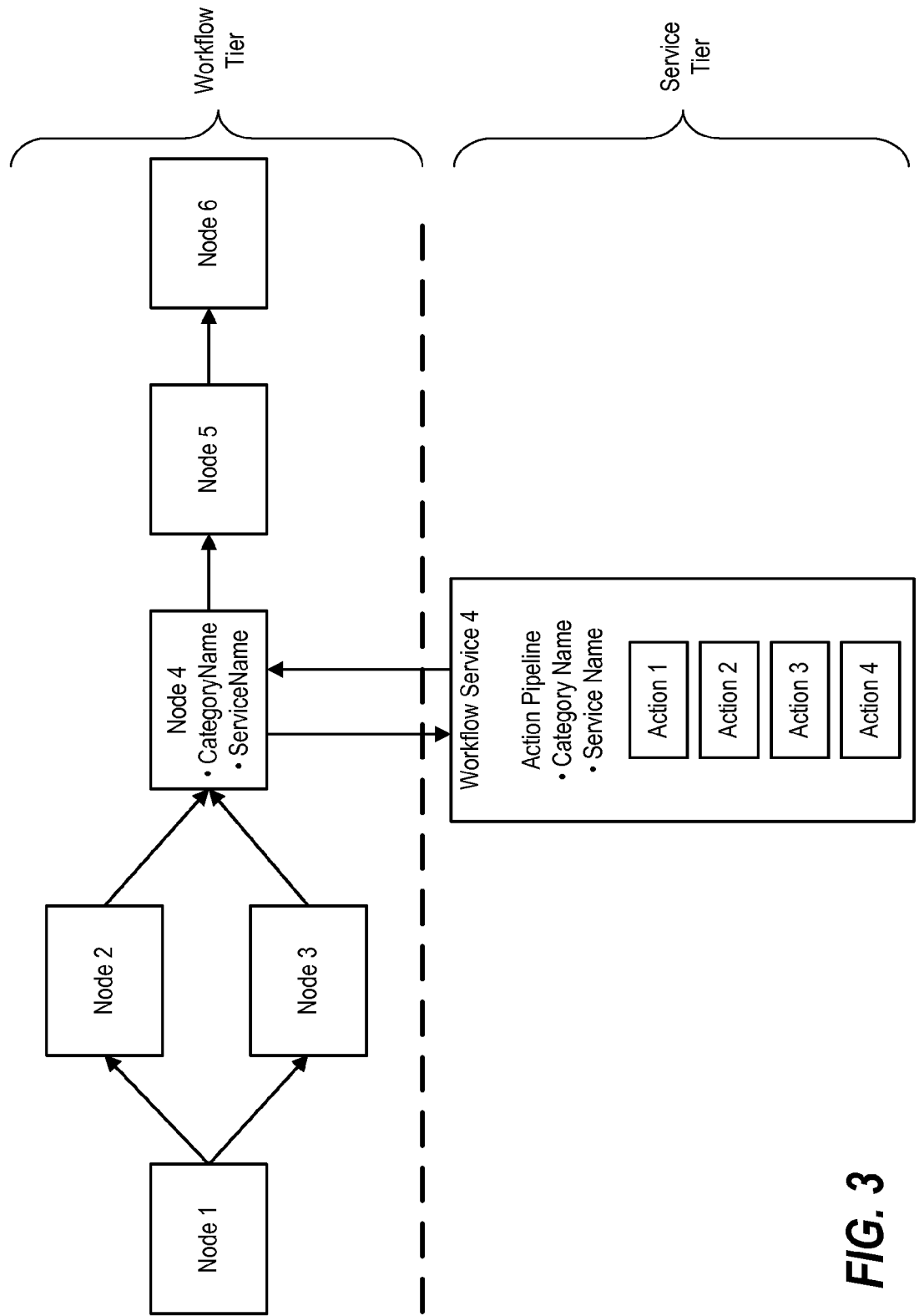
FIG. 3 is a block diagram illustrating workflow components of a workflow-based content delivery system.

FIG. 3 is a block diagram illustrating a generic example workflow for content delivery. In the workflow tier (above the dotted line) is a sequence of six connected nodes. Each node, also known as a task, represents a data file or business process to execute by a workflow processor or workflow engine as part of session management. For example, the session manager can access a data file, such as an XML (Extensible Markup Language) that defines a sequence of processes to execute, or references a sequence of processes to execute. FIG. 4 shows a code snippet of an example definition data file, and will be discussed more below. Note that the sequence of nodes can include branches, if/then logic, etc. For example, Node 1 is processed by a workflow engine. Depending on data generated from processing Node 1, the workflow engine will then continue to either Node 2 or Node 3. Some data from processing Node 1 can be passed to Node 2, Node 3, or a subsequent node.

As data files, nodes do not generally know about each other, but it is the workflow engine that understands what nodes to talk to and what information to retrieve from one node to pass to another node. As such, the workflow engine itself can include the functionality that provides the realtime processing. In other words, in one embodiment, a workflow engine can be modified or improved to function to cache node definitions, track data passed from node to node, and streamline memory management to provide a realtime session management processing.

Continuing with this example, after processing of either Node 2 or Node 3, processing continues to Node 4. Note that each Node maps to, or otherwise references, a Workflow Service from the service tier. The workflow service can be either a referenced action to process or a data file defining one or more actions to execute. Example actions might be to send a text message, post a message on a social network account, charge a fee to a particular account, etc. In some embodiments, each service is represented as a definition of a workflow service. In this example, Workflow Service 4 includes four actions to perform when invoked. For simplicity, in the example in FIG. 3, only Node 4 is shown with a corresponding workflow service, though each Node in the workflow tier can reference one or more corresponding workflow services. Some nodes may not reference any workflow services, while others may reference more than one service. FIG. 5. shows a code snippet of an example workflow service data file.

The workflow tier of FIG. 3 can also be used to illustrate graphical editing of the workflow of a given session manager. For example, using a graphical editor or similar input means, a user can graphically arrange a layout of workflow nodes, including designating a connection sequence and any branching. This can include high-level control constructs such as decision nodes, if-then logic, branching, rejoining, nodes to execute in parallel, and even a sequence of nodes that can be completed after initiating delivery of video content. A user can also edit data files directly. Thus, a new service can be added to a given content delivery system without requiring new hardware and/or new software, as is the case with conventional monolithic approaches. When adding a new node to an existing service, the workflow can be changed either automatically or via a graphical editor. Upon adding the new node, the system creates a mapping from the new node to an existing node. The mapping does not necessarily need to be shown in a graphical editor. The mapping can include a service name, category name, data, etc. After the new node is added, the system can create a corresponding file such as by creating a .PAR file. Similarly, when adding a new node to a new service, the new service can be designed and implemented by adding a data file to a given database, a corresponding new node data file can be created for addition to the workflow sequence, and then added graphically or textually to a workflow sequence, and then the system would create the corresponding mappings and definition file.

Now, by way of a more specific example, consider that a given MSO desires to offer a new notification service to subscribers. This new service might enable an option to have a text message sent to a subscriber's mobile device anytime video-on-demand content is selected that has a specific rating. For example, a subscriber could select to be notified via text message anytime a movie was selected with a PG-13 rating, R rating, or higher. Such a service might be desired by parents to know if inappropriate video happens to be selected by their children. Conventionally, such a service might take months or years for a MSO to roll out. With techniques disclosed herein, however, such a service can be added quickly and without needing to update a content delivery system itself. Instead, a node is created that references this service, a workflow service data file is created and stored in a database, and then a user can add the new node to an existing workflow sequence at a centralized location, and the next time a session manager receives a request to initiate a session for on-demand content, the session manager loads a workflow data file having the new node for text messaging notification, and, upon processing the updated workflow sequence, the workflow engine will process the new text messaging node, which references a text messaging service, which then sends a corresponding message.

Returning to FIG. 4, the code snippet shown illustrates portions of an example data file for the example text messaging service to add. In line 402 the data file identifies a node name. Lines 407 then identify mappings to check or verify various features, such as a selected title's price, a movie rating, a TV rating, etc. Depending on a subscriber's preferences and information from the selected title, the text message node, or corresponding workflow service, can instruct to send a text message that may include title identification data, price, rating, or other requested information. FIG. 5 then illustrates an example data file that provides instructions for initiating a text message transmission.

More specifically, the workflow engine can identify a particular node using the "esbsServiceName" and "esbCategoryName," such as for use in the workflow engine's memory map. Lines 407 also identify how the workflow engine passes variables into a corresponding service. Using this data file, the workflow engine can identify what to send as inputs and what to retrieve as outputs. Lines 407 can be considered as mappings from one namespace to another namespace. Note that BPM refers to business process manager. The node data file of FIG. 5 and the workflow service file of FIG. 6 can include mappings or references between the two so that the workflow engine can identify what data to deliver and retrieve. The workflow service file can also include a list of actions to execute, such as by having a Java class to call to implement a particular notification service.

Figure 6:
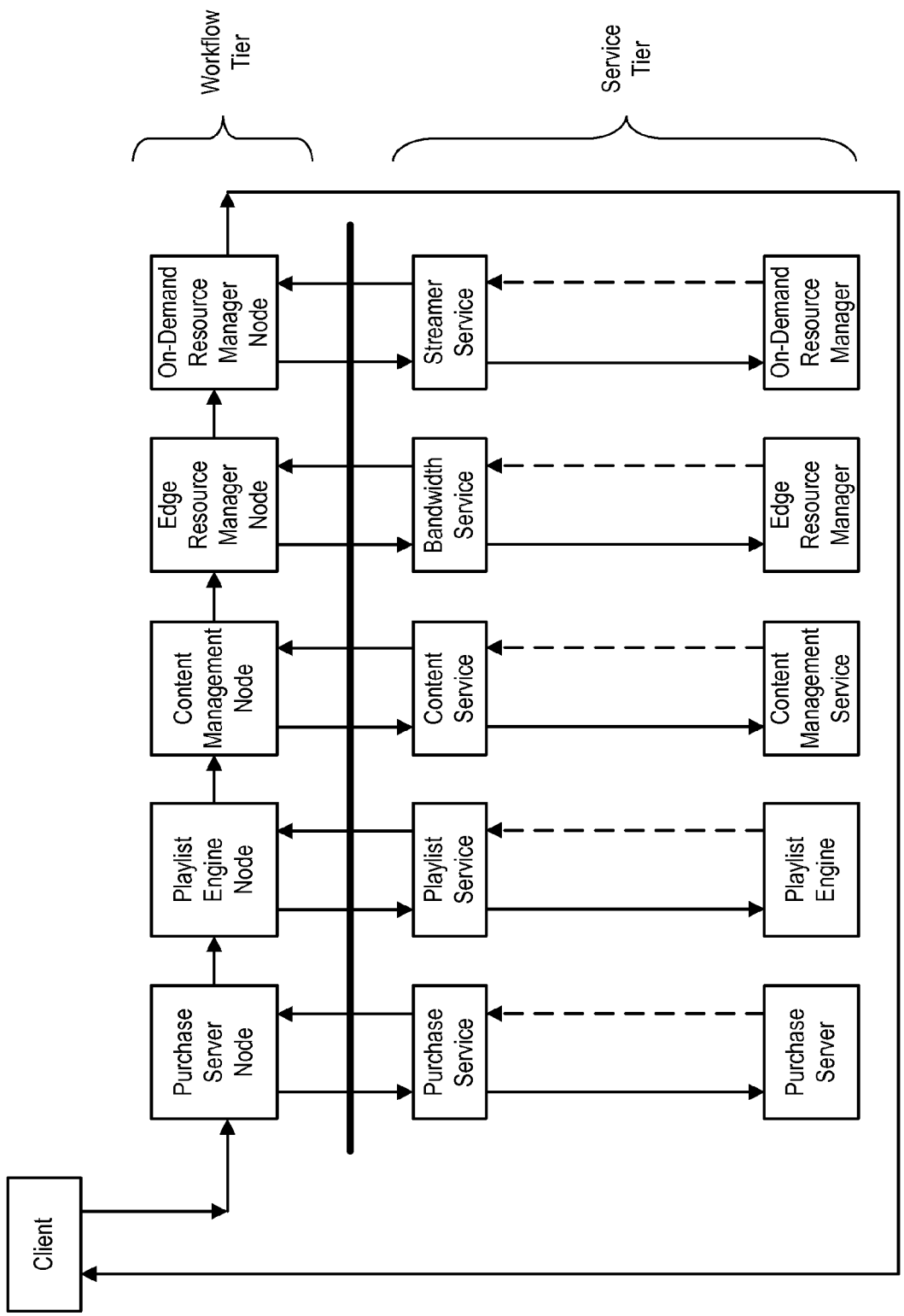
FIG. 6. is a block diagram of an example workflow of a session manager operating in a QAM-based content delivery system according to embodiments herein.
Figure 7:
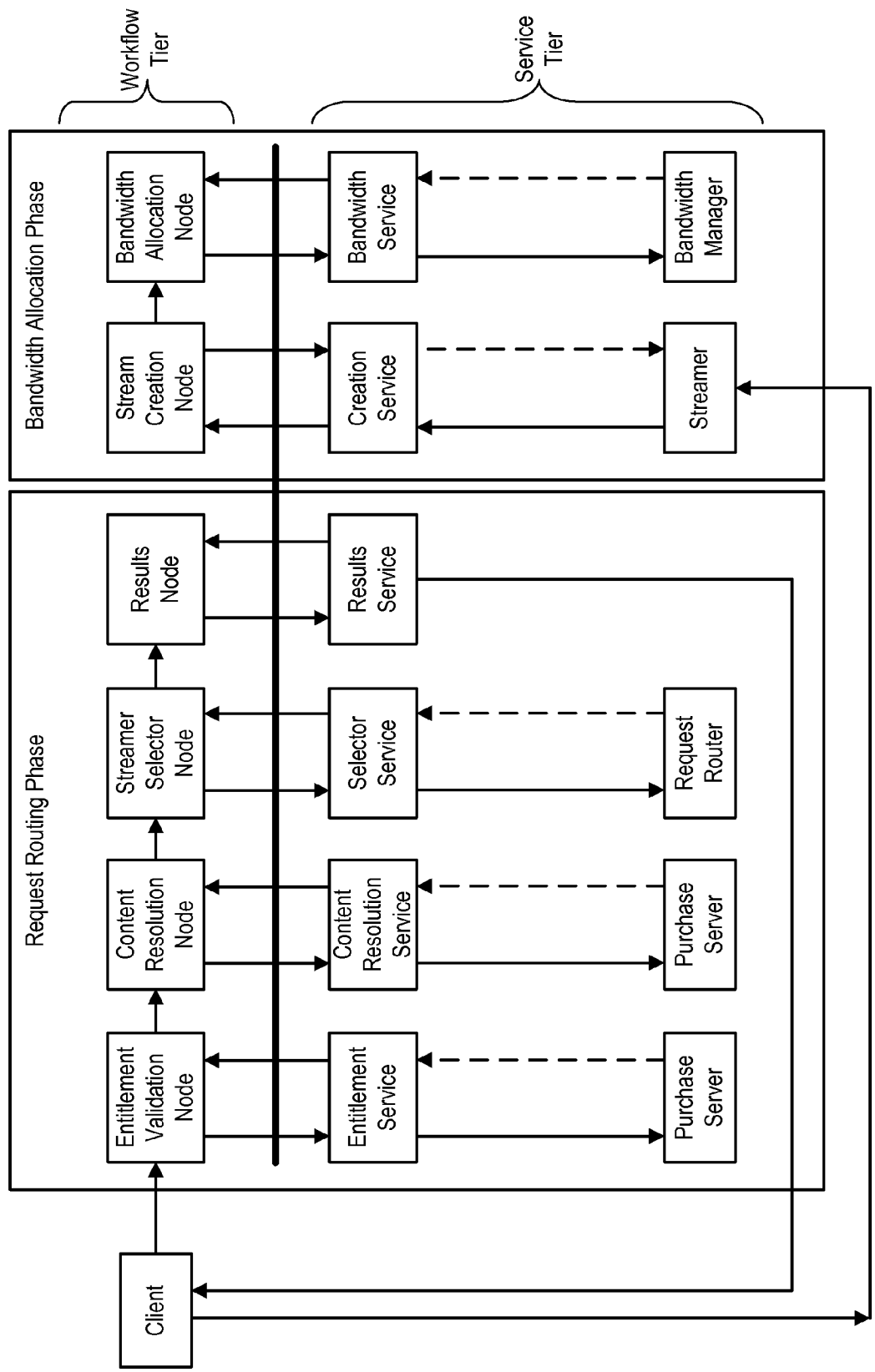
FIG. 7. is a block diagram of an example workflow of a session manager operating in an IP-based content delivery system according to embodiments herein.

FIGS. 6 and 7 are block diagrams of an example workflow-based session manager or session management system that operates in a Quadrature amplitude modulation (QAM)-based system (FIG. 6), and in an Internet Protocol (IP)-based video delivery system (FIG. 7). These example sequences are generalized setup sequences for QAM- and IP-based systems. Note that there are discrete activities or nodes that are connected or stitched together to define a processing sequence. Any given node can be called upon or executed based on what happened during execution of one or more previous nodes. Thus, what happens during processing of one node can affect or impact what happens during processing of a second node. The session manager can then be updated at a central session management location, and execute instances of the session managers centrally to control headends. Thus, without session managers located at the headends, the headends can then focus on video transmission/retransmission activities.

More specifically, both example session managers can address a standard set of operations that can be performed for Session Setup, even though the execution order of the services may vary between them. Typical services expected can include: authenticate/authorize a user to view requested content; expand requested content into a playlist; allocate the resource(s) that will originate streaming of the content (VOD Server or Streamer or CDN Node), allocate the resource that will deliver content to the consumer device (QAM or CMTS), and notify a billing system that a purchase has been made. Similarly, when tearing down a stream the session manager can free up resources that were allocated during session setup. In general, a client device requests content, such as making a selection for on-demand video, which request causes the system to initiate a session. The session manager, in general, then processes a workflow sequence. In FIGS. 6 and 7, the sequence is illustrated going from left to right. Each node can be selected and positioned as part of a business process, and thus the node selection can vary substantially depending upon a given application.

Figure 12:
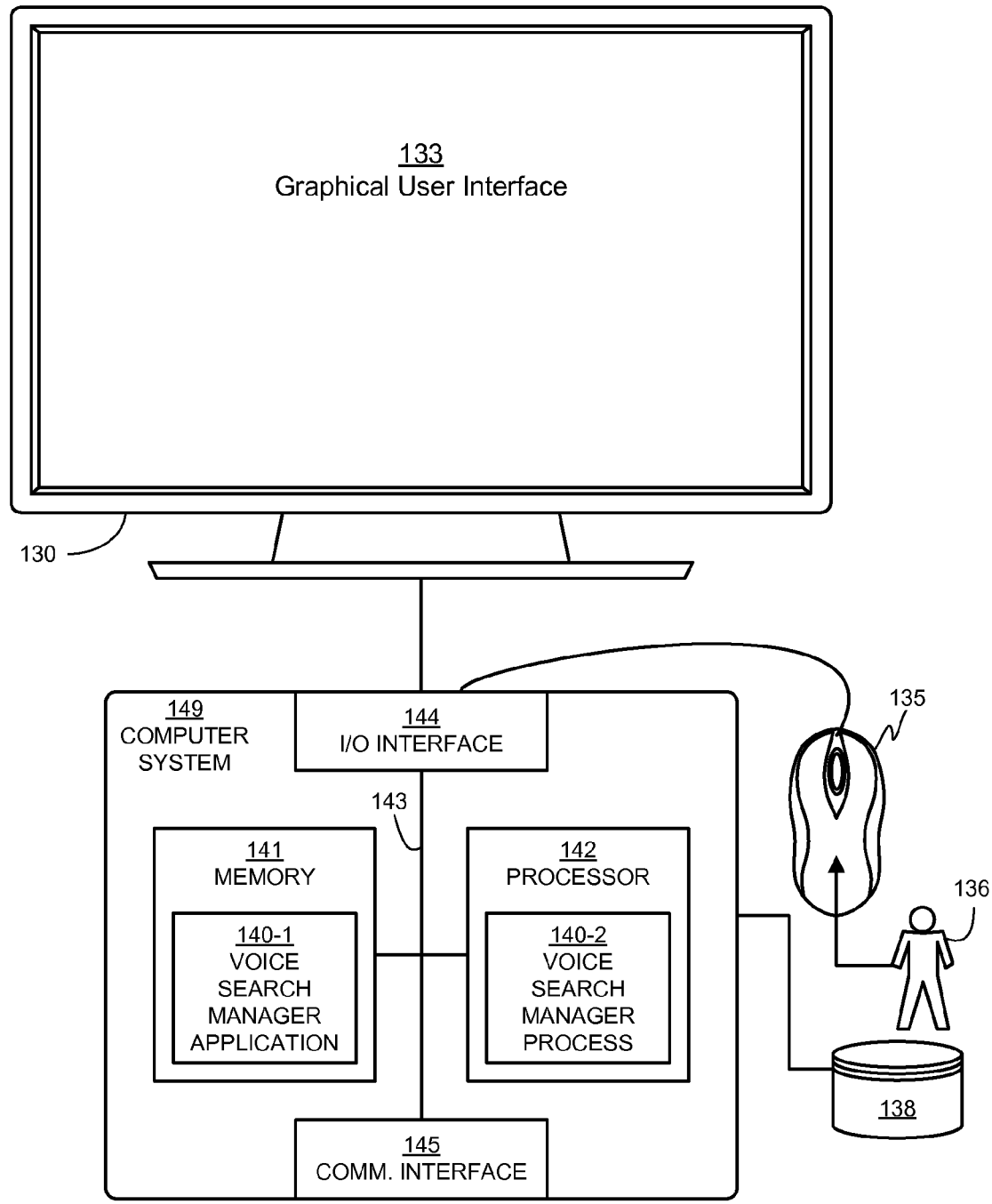
FIG. 12 is an example block diagram of a session manager operating in a computer/network environment according to embodiments herein.

FIG. 12 illustrates an example block diagram of a session manager/content manager 140 operating in a computer/network environment according to embodiments herein. In summary, FIG. 12 shows computer system 149 displaying a graphical user interface 133 that provides a session manager and/or session manager editor. Physical system aspects of FIG. 12 will be described in more detail following a description of the flow charts.

Functionality associated with session manager 140 will now be discussed via flowcharts and diagrams in FIGS. 8-11. For purposes of the following discussion, the session manager, session manager editor, or content delivery system or other appropriate entity performs steps in the flowcharts.

Figure 8:
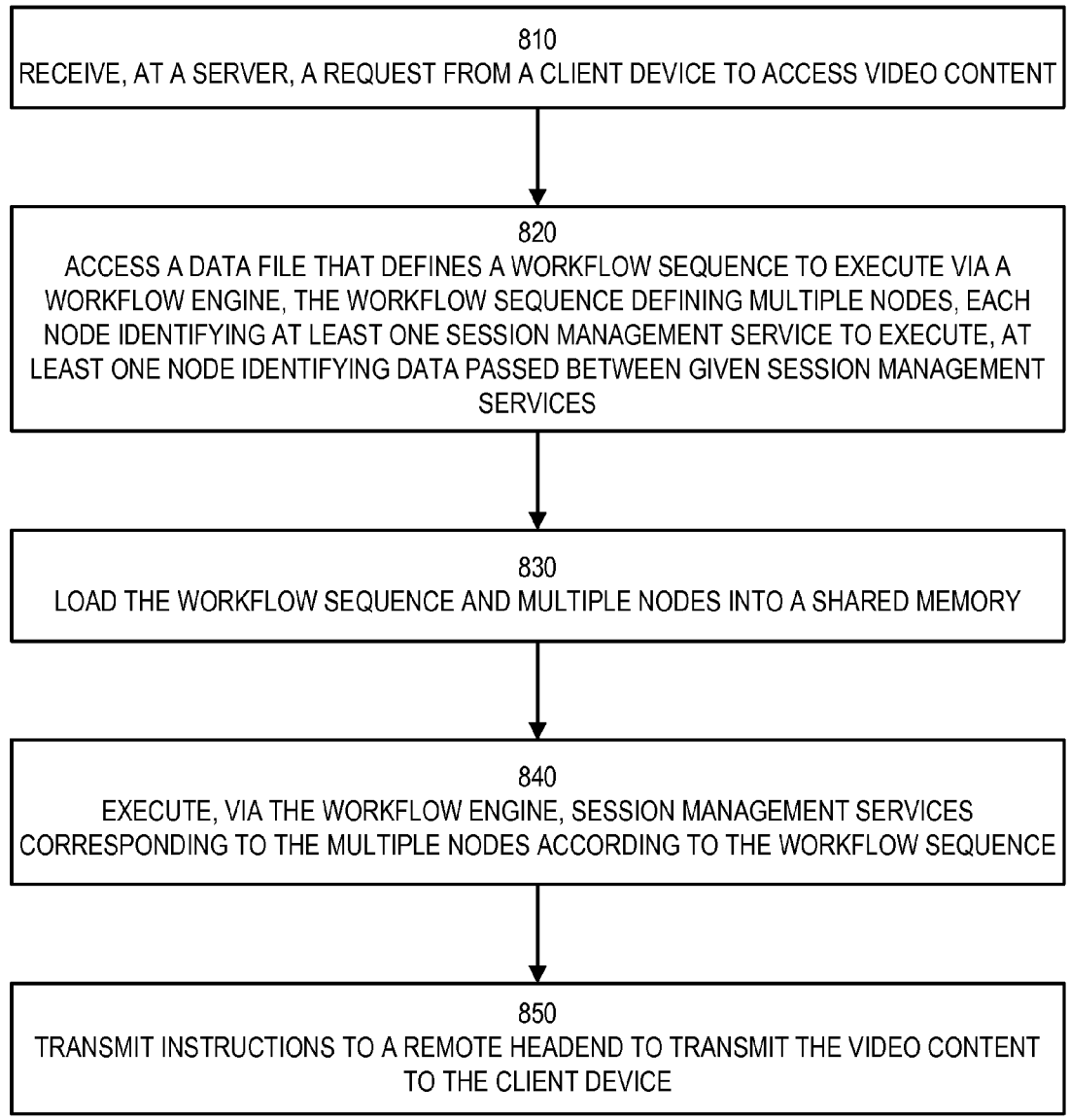
FIG. 8 is a flowchart illustrating an example of a process supporting content delivery session management according to embodiments herein.

Now describing embodiments more specifically, FIG. 8 is a flow chart illustrating embodiments disclosed herein.

In step 810, the session manager receives, at a server, a request from a client device to access video content. For example, a user viewing cable television uses a set-top box controller to select a particular on-demand video title, or a user operating a tablet computer or cell phone selects a particular vide to stream.

In step 820, the session manager accesses a data file that defines a workflow sequence to execute via a workflow engine. For example, this data file could be an XML file, text file, or other data file. The workflow sequence defines multiple nodes, with each node identifying at least one session management service to execute. The multiple nodes can all be included within the data file, or, alternatively, could reference individual data files for the workflow nodes. At least one of these nodes can identify data passed between given session management services. For example, a particular node identifies a title of a movie, extracts price and rating, and passes that data to a subsequent node or workflow service.

In step 830, the session manager loads the workflow sequence and multiple nodes into a shared memory. For example, the session manager can load the workflow sequence into RAM memory. By loading the workflow sequence into memory, the session manager does not need to persist data during session initialization, which helps processing speed to be sufficiently fast for subscriber expectations.

In step 840, the session manager executes, via the workflow engine, session management services corresponding to the multiple nodes according to the workflow sequence. In other words, the session manager processes a sequence of business processes according to a specified order defined by the workflow data file.

In step 850, the session manager transmits instructions to a remote headend to transmit the video content to the client device. For example, the session manager may not execute the video delivery itself. With a centralized session manager and remote headends or transmission points, the session manager sends instructions to those headends to begin transmitting, streaming, or otherwise delivering requested video content to users.

Figure 9:
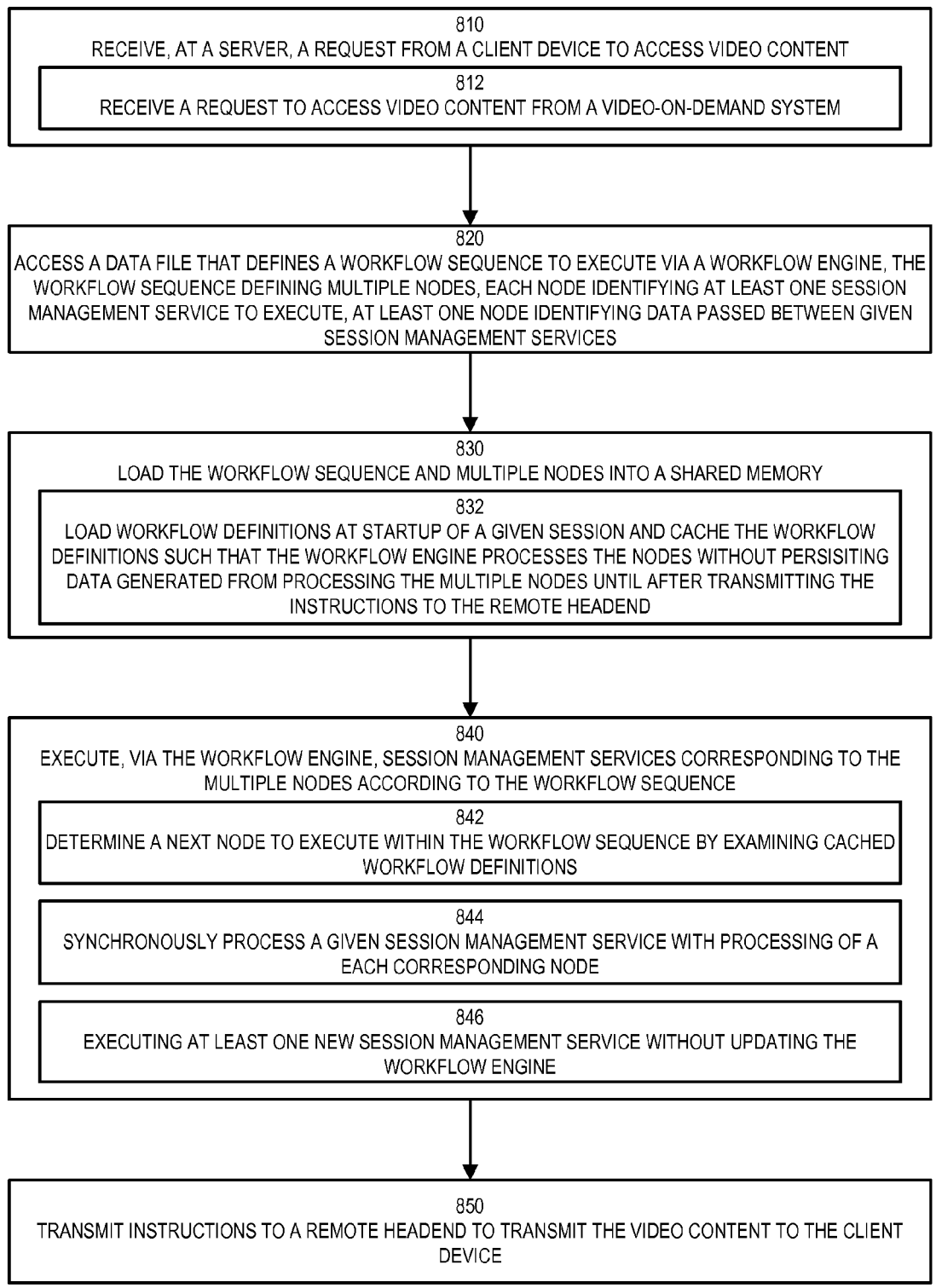
FIG. 9 is a flowchart illustrating an example of a process supporting content delivery session management according to embodiments herein.

FIG. 9 includes a flow chart illustrating additional and/or alternative embodiments and optional functionality of the session manager 140 as disclosed herein.

In step 810, the session manager receives, at a server, a request from a client device to access video content.

In step 812, the session manager receives a request to access video content from a video-on-demand system. For example, a cable subscriber makes a selection to watch an on-demand/instant viewing movie, or even selects a new channel to watch. In some embodiments, conventional broadcast channels themselves can be configured for transmitting video content using a session manager for each channel.

In step 820, the session manager accesses a data file that defines a workflow sequence to execute via a workflow engine. The workflow sequence defines multiple nodes, each node identifying at least one session management service to execute, with at least one node identifying data passed between given session management services.

In step 830, the session manager loads the workflow sequence and multiple nodes into a shared memory.

In step 832, the session manager loads workflow definitions at startup of a given session and caches the workflow definitions such that the workflow engine processes the nodes without persisting data generated from processing the multiple nodes until after transmitting the instructions to the remote headend. By executing the workflow processing and data transfer in memory, the session manager completes a given workflow sequence quickly.

In step 840, the session manager executes, via the workflow engine, session management services corresponding to the multiple nodes according to the workflow sequence.

In step 842, the session manager determines a next node to execute within the workflow sequence by examining cached workflow definitions.

In step 844, the session manager synchronously processes a given session management service with processing of each corresponding node. In other words, during processing of each node, the system processes a corresponding service and then proceeds to a next service. By way of a non-limiting example, in FIG. 6, in response to processing the Purchase Server Node, the session manager synchronously processes the Purchase Service and any corresponding actions, and then proceeds to processing the Playlist Engine Node.

In step 846, the session manager executes at least one new session management service without updating the workflow engine. By structuring such a content delivery system as workflow-based, services can be added, removed, or modified without updating the workflow engine. Both a node and a corresponding service can be updated, or just the corresponding service can be updated.

In step 850, the session manager transmits instructions to a remote headend to transmit the video content to the client device. This can include transmitting instructions to stream the video content to the client device.

The workflow definitions can define data passed from/to/ among each session management service. Not all session management services may require data generated or retrieved from preceding services. The workflow engine processes the workflow sequence of nodes, executed prior to transmitting instructions to the remote headend, in less than about 500 milliseconds. Note that the sequence of nodes executed can comprise only those nodes required to be processed prior to beginning transmission of video content. For example, a given workflow sequence can have multiple branches. Some branches may relate to notification services or logging services that do not necessarily need to be completed prior to authorizing a user and initiating video playback. Thus, one embodiment includes a workflow processing engine that executes a sequence of tasks (as data files) in realtime to provide session management and authorize playback in less than about 800 milliseconds, and even in less than about 250 milliseconds. Another embodiment includes modifying an existing workflow engine to process nodes in realtime.

Figure 10:
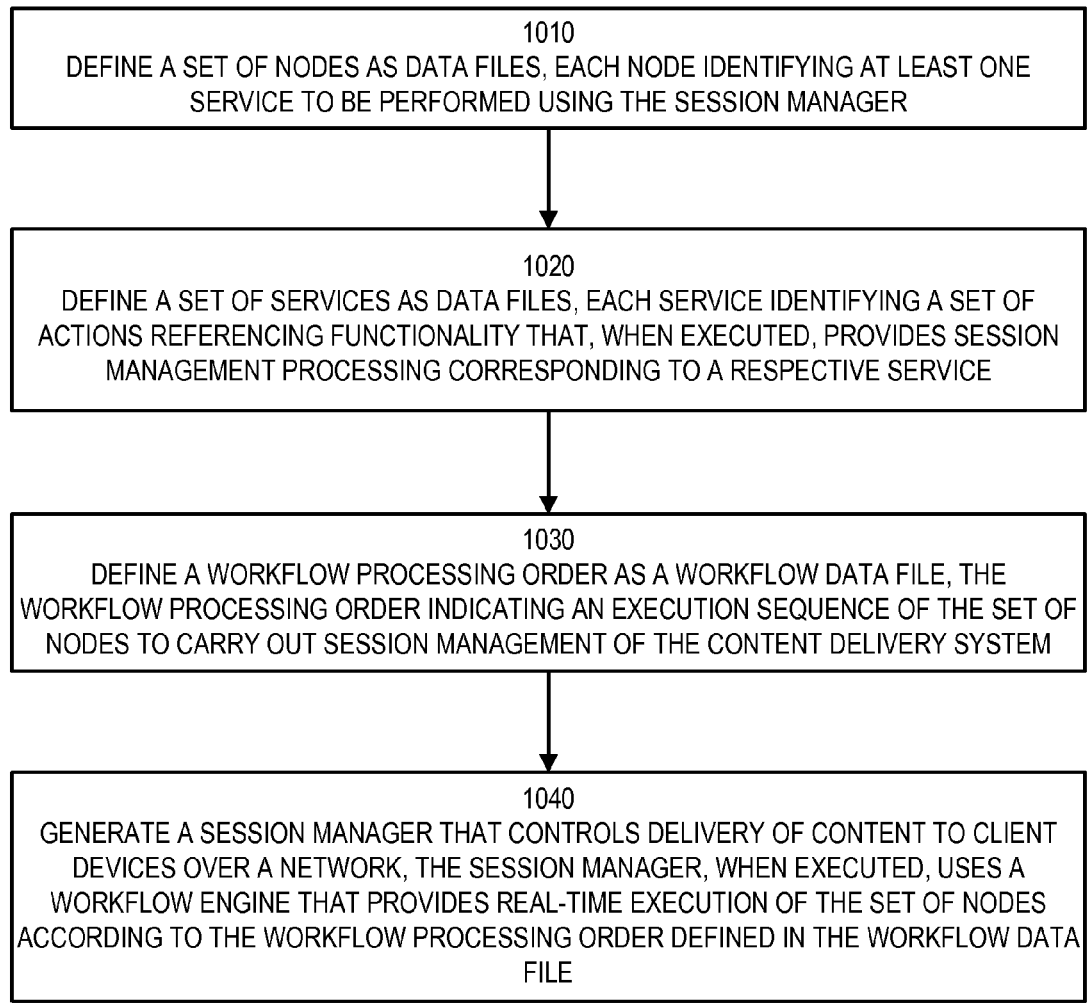
FIG. 10 is a flowchart illustrating an example of a process supporting content delivery session management according to embodiments herein.

FIG. 10 is a flow chart illustrating embodiments disclosed herein. Such embodiments can include a session manager, which can incorporate a session manager editor, or similar content delivery system. In step 1010, the content delivery system defines a set of nodes as data files, with each node identifying at least one service to be performed using the session manager.

In step 1020, the content delivery system defines a set of services as data files, each service identifying a set of actions referencing functionality that, when executed, provides session management processing corresponding to a respective service.

In step 1030, the content delivery system defines a workflow processing order as a workflow data file. The workflow processing order indicates an execution sequence of the set of nodes to carry out session management of the content delivery system.

In step 1040, the content delivery system generates a session manager that controls delivery of content to client devices over a network. The session manager, when executed, uses a workflow engine that provides real-time execution of the set of nodes according to the workflow processing order defined in the workflow data file.

Figure 11:
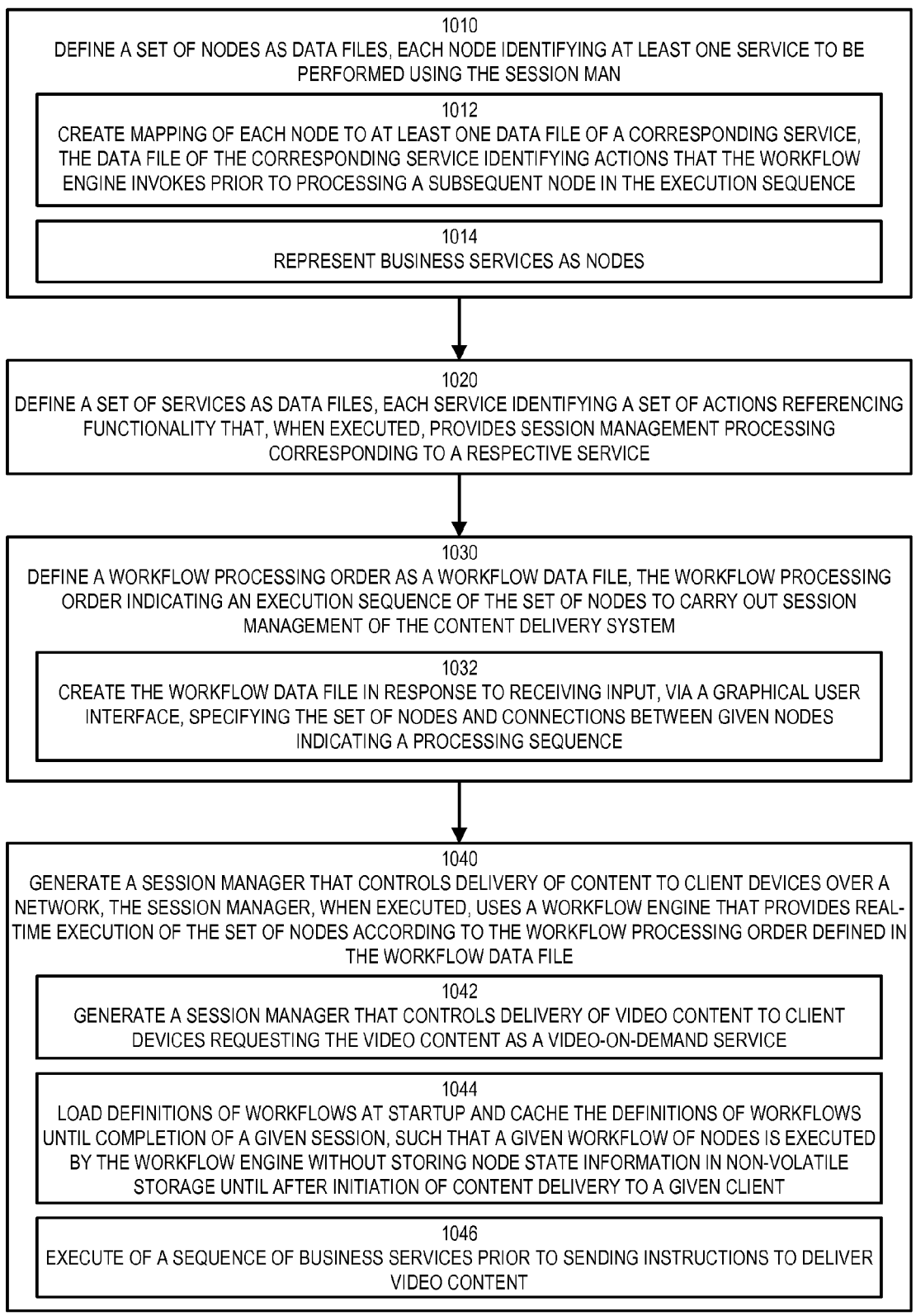
FIG. 11 is a flowchart illustrating an example of a process supporting content delivery session management according to embodiments herein.

FIG. 11 includes a flow chart illustrating additional and/or alternative embodiments and optional functionality of the content delivery system as disclosed herein.

In step 1010, the content delivery system defines a set of nodes as data files, with each node identifying at least one service to be performed using the session manager. Business services can be represented as nodes (step 1014).

In step 1012, the content delivery system creates mapping of each node to at least one data file of a corresponding service. The data file of the corresponding service identifies actions that the workflow engine invokes prior to processing a subsequent node in the execution sequence. For example, such actions could include retrieving subscriber status, retrieving a title rating, etc.

In step 1020, the content delivery system defines a set of services as data files, each service identifying a set of actions referencing functionality that, when executed, provides session management processing corresponding to a respective service.

In step 1030, the content delivery system defines a workflow processing order as a workflow data file. The workflow processing order indicates an execution sequence of the set of nodes to carry out session management of the content delivery system.

In step 1032, the content delivery system creates the workflow data file in response to receiving input, via a graphical user interface, specifying the set of nodes and connections between given nodes indicating a processing sequence. Thus, a content provider can create workflows and service changes without needed to update content delivery hardware.

In step 1040, the content delivery system generates a session manager that controls delivery of content to client devices over a network. The session manager, when executed, uses a workflow engine that provides real-time execution of the set of nodes according to the workflow processing order defined in the workflow data file.

In step 1042, the content delivery system generates a session manager that controls delivery of video content to client devices requesting the video content as a video-on-demand service.

In step 1044, the session manager loads definitions of workflows at startup and caches the definitions of workflows until completion of a given session, such that a given workflow of nodes is executed by the workflow engine without storing node state information in non-volatile storage until after initiation of content delivery to a given client. Without persisting data during workflow processing for session startup, the session manager can provide a workflow-based session management system fast enough for on-demand video applications. For example, viewers typically do not wish to wait for video content to begin playing for more than about half a second. Techniques disclosed herein can complete workflow processing in about 100-200 milliseconds.

In step 1046, session manager executes a sequence of business services prior to sending instructions to deliver video content. For example, certain authorization, billing and other tasks may need to be completed before streaming content.

In another embodiment, the content delivery system includes a session manager editor or other graphical-based editor for controlling content delivery to a client device. In this embodiment, the content delivery system receives input, via a user interface, that selects a set of nodes. For example, a user can access a menu or other data store of node and drag these to a sequencing area, or the user can select specific nodes as needed in building a sequence. Each node is or represents a data file that identifies at least one session management service for a session manager to execute via a workflow engine. The content delivery system receives input, via the user interface, that specifies a sequence of nodes for the workflow engine to execute. The content delivery system generates a workflow data file that defines the sequence of nodes for the workflow engine to execute. Then the content delivery system or session manager editor creates a session manager that, when executed, controls delivery of content to client devices via the workflow engine. This workflow engine executes session management services according to the defined sequence of nodes from the workflow data file. Such a session manager can be used for controlling delivery of video content to client devices, including devices using a video-on-demand service.

Accordingly, the session manager when executed, loads definitions of workflows at startup and caches the definitions of workflows until completion of a given session, such that a given workflow of nodes is executed by the workflow engine without storing node state information in non-volatile storage until after initiation of content delivery to a given client, thereby increasing processing speed.

Using a graphical editor, a user can specify a graphical layout of icons representing the nodes. The graphical layout or arrangement accordingly specifies a sequence of connected nodes such that the workflow data file is generated based on the graphical layout of icons representing the nodes. The graphical editor can also receive input that modifies the graphical layout of icons, and then update workflow definitions in the workflow data file.

Continuing with FIG. 12, the following discussion provides a basic embodiment indicating how to carry out functionality associated with the session manager 140 as discussed above. It should be noted, however, that the actual configuration for carrying out the session manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the session manager 140 of computer system 149 to communicate over a network and, if necessary, retrieve any data required to create views, process content, communicate with a user, etc. according to embodiments herein.

As shown, memory system 141 is encoded with session manager 140-1 that supports functionality as discussed above and as discussed further below. Session manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the session manager 140-1. Execution of the session manager 140-1 produces processing functionality in session manager process 140-2. In other words, the session manager process 140-2 represents one or more portions of the session manager 140 performing within or upon the processor 142 in the computer system 149.

It should be noted that, in addition to the session manager process 140-2 that carries out method operations as discussed herein, other embodiments herein include the session manager 140-1 itself (i.e., the un-executed or non-performing logic instructions and/or data). The session manager 140-1 may be stored on a non-transitory, tangible computer-readable storage medium including computer readable storage media such as floppy disk, hard disk, optical medium, etc. According to other embodiments, the session manager 140-1 can also be stored in a memory type system such as in firmware, read only memory (ROM), or, as in this example, as executable code within the memory system 141.

In addition to these embodiments, it should also be noted that other embodiments herein include the execution of the session manager 140-1 in processor 142 as the session manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method of session management for controlling video delivery to a client device over a network, the computer-implemented method comprising:
   receiving, at a server, a request from a client device to access video content;
   accessing a data file that defines a workflow sequence to execute via a workflow engine, the workflow sequence defining multiple nodes, each node identifying at least one session management service to execute, wherein at least one node identifies data passed between given session management services, and wherein a new session management service can be added to the workflow sequence without interrupting service to the client device;
   loading the workflow sequence and multiple nodes into a shared memory;
   executing, via the workflow engine, session management services corresponding to the multiple nodes according to the workflow sequence; and
   transmitting instructions to a remote headend to transmit the video content to the client device.

2. The computer-implemented method of claim 1, wherein loading the workflow sequence and multiple nodes into a shared memory includes loading workflow definitions at startup of a given session and caching the workflow definitions such that the workflow engine processes the nodes without persisiting data generated from processing the multiple nodes until after transmitting the instructions to the remote headend.

3. The computer-implemented method of claim 2, further comprising determining a next node to execute within the workflow sequence by examining cached workflow definitions.

4. The computer-implemented method of claim 2, further comprising:
   wherein executing session management services includes synchronously processing a given session management service by each corresponding node; and
   wherein the workflow definitions define data passed from each session management service.

5. The computer-implemented method of claim 1, further comprising:
   wherein receiving the request to access video content includes receiving a request to access video content from a video-on-demand system; and
   wherein transmitting instructions to the remote headend includes transmitting instructions to stream the video content to the client device.

6. The computer-implemented method of claim 5, wherein the workflow engine processes the workflow sequence of nodes, executed prior to transmitting instructions to the remote headend, in less than about 500 milliseconds.

7. The computer-implemented method of claim 1, wherein executing session management services includes executing at least one new session management service without updating the workflow engine.

8. A system for providing session management for controlling video delivery to a client device over a network, the system comprising:
   a processor; and
   a memory coupled to the processor, the memory storing instructions that, when executed by the processor, cause the system to perform the operations of:
      receiving, at a server, a request from a client device to access video content;
      accessing a data file that defines a workflow sequence to execute via a workflow engine, the workflow sequence defining multiple nodes, each node identifying at least one session management service to execute, wherein at least one node identifies data passed between given session management services, and wherein a new session management service can be added to the workflow sequence without interrupting service to the client device;
      loading the workflow sequence and multiple nodes into a shared memory;
      executing, via the workflow engine, session management services corresponding to the multiple nodes according to the workflow sequence; and
      transmitting instructions to a remote headend to transmit the video content to the client device.

9. The system of claim 8, wherein loading the workflow sequence and multiple nodes into a shared memory includes loading workflow definitions at startup of a given session and caching the workflow definitions such that the workflow engine processes the nodes without persisting data generated from processing the multiple nodes until after transmitting the instructions to the remote headend.

10. The system of claim 9, further comprising determining a next node to execute within the workflow sequence by examining cached workflow definitions.

11. The system of claim 9, further comprising:
   wherein executing session management services includes synchronously processing a given session management service by each corresponding node; and
   wherein the workflow definitions define data passed from each session management service.

12. The system of claim 8, further comprising:
   wherein receiving the request to access video content includes receiving a request to access video content from a video-on-demand system; and
   wherein transmitting instructions to the remote headend includes transmitting instructions to stream the video content to the client device.

13. The system of claim 12, wherein the workflow engine processes the workflow sequence of nodes, executed prior to transmitting instructions to the remote headend, in less than about 500 milliseconds.

14. The system of claim 8, wherein executing session management services includes executing at least one new session management service without updating the workflow engine.

15. One or more non-transitory media that includes instructions for execution and when executed by a processor is operable to perform operations, comprising:
   receiving, at a server, a request from a client device to access video content;

accessing a data file that defines a workflow sequence to execute via a workflow engine, the workflow sequence defining multiple nodes, each node identifying at least one session management service to execute, wherein at least one node identifies data passed between given session management services, and wherein a new session management service can be added to the workflow sequence without interrupting service to the client device;

loading the workflow sequence and multiple nodes into a shared memory;

executing, via the workflow engine, session management services corresponding to the multiple nodes according to the workflow sequence; and transmitting instructions to a remote headend to transmit the video content to the client device.

16. The media of claim 15, wherein loading the workflow sequence and multiple nodes into a shared memory includes loading workflow definitions at startup of a given session and caching the workflow definitions such that the workflow engine processes the nodes without persisting data generated from processing the multiple nodes until after transmitting the instructions to the remote headend.

17. The media of claim 16, further comprising determining a next node to execute within the workflow sequence by examining cached workflow definitions.

18. The media of claim 16, further comprising:
wherein executing session management services includes synchronously processing a given session management service by each corresponding node; and
wherein the workflow definitions define data passed from each session management service.

19. The media of claim 15, further comprising:
wherein receiving the request to access video content includes receiving a request to access video content from a video-on-demand system; and
wherein transmitting instructions to the remote headend includes transmitting instructions to stream the video content to the client device.

20. The media of claim 19, wherein the workflow engine processes the workflow sequence of nodes, executed prior to transmitting instructions to the remote headend, in less than about 500 milliseconds.

21. The media of claim 15, wherein executing session management services includes executing at least one new session management service without updating the workflow engine.

\* \* \* \* \*